United States Patent
Kanamori et al.

[11] Patent Number: 6,138,826
[45] Date of Patent: Oct. 31, 2000

[54] WATERPROOF CASE FOR CAMERA

[75] Inventors: Shino Kanamori; Michihiro Miyake, both of Asaka, Japan

[73] Assignee: Fuji Photo Film Co., Ltd., Kanagawa, Japan

[21] Appl. No.: 09/240,706

[22] Filed: Feb. 2, 1999

[30] Foreign Application Priority Data

Feb. 2, 1998 [JP] Japan ................................. 10-021335
Feb. 2, 1998 [JP] Japan ................................. 10-021336
Feb. 2, 1998 [JP] Japan ................................. 10-021337

[51] Int. Cl.[7] .................................................. B65D 85/38
[52] U.S. Cl. ........................................ 206/316.2; 206/811
[58] Field of Search ................................ 206/320, 316.2, 206/754, 755, 811

[56] References Cited

U.S. PATENT DOCUMENTS

| | | |
|---|---|---|
| 1,272,457 | 7/1918 | Kandler et al. |
| 2,926,573 | 3/1960 | Weiss ................................. 206/316.2 |
| 3,314,348 | 4/1967 | Lang ................................... 206/316.2 |
| 5,159,366 | 10/1992 | Gell, Jr. ............................... 206/811 |
| 5,822,622 | 10/1998 | Inoue ................................... 396/27 |

FOREIGN PATENT DOCUMENTS

| | | |
|---|---|---|
| 7-159870 | 7/1995 | Japan . |
| 7-159873 | 7/1995 | Japan . |
| 9-80623 | 9/1997 | Japan . |

*Primary Examiner*—David T. Fidei
*Attorney, Agent, or Firm*—Sughrue, Mion, Zinn, Macpeak & Seas, PLLC

[57] ABSTRACT

A waterproof case for a camera comprises a case body, which contains the camera, and a lid, which is hinged to the case body and closes an opening of the case body watertightly. The hinge connecting the lid to the case body is provided with a friction member that holds the lid stationary at an arbitrary opening angle or at a predetermined opening angle regardless of the weight of the lid. The waterproof case is provided with a camera attachment member and a coil spring for moving the camera contained in the case body to a predetermined position as the lid opens. It is therefore possible to easily exchange recording mediums, and replace and charge a battery in the camera without taking the camera out completely from the case body.

23 Claims, 11 Drawing Sheets

F I G. 1
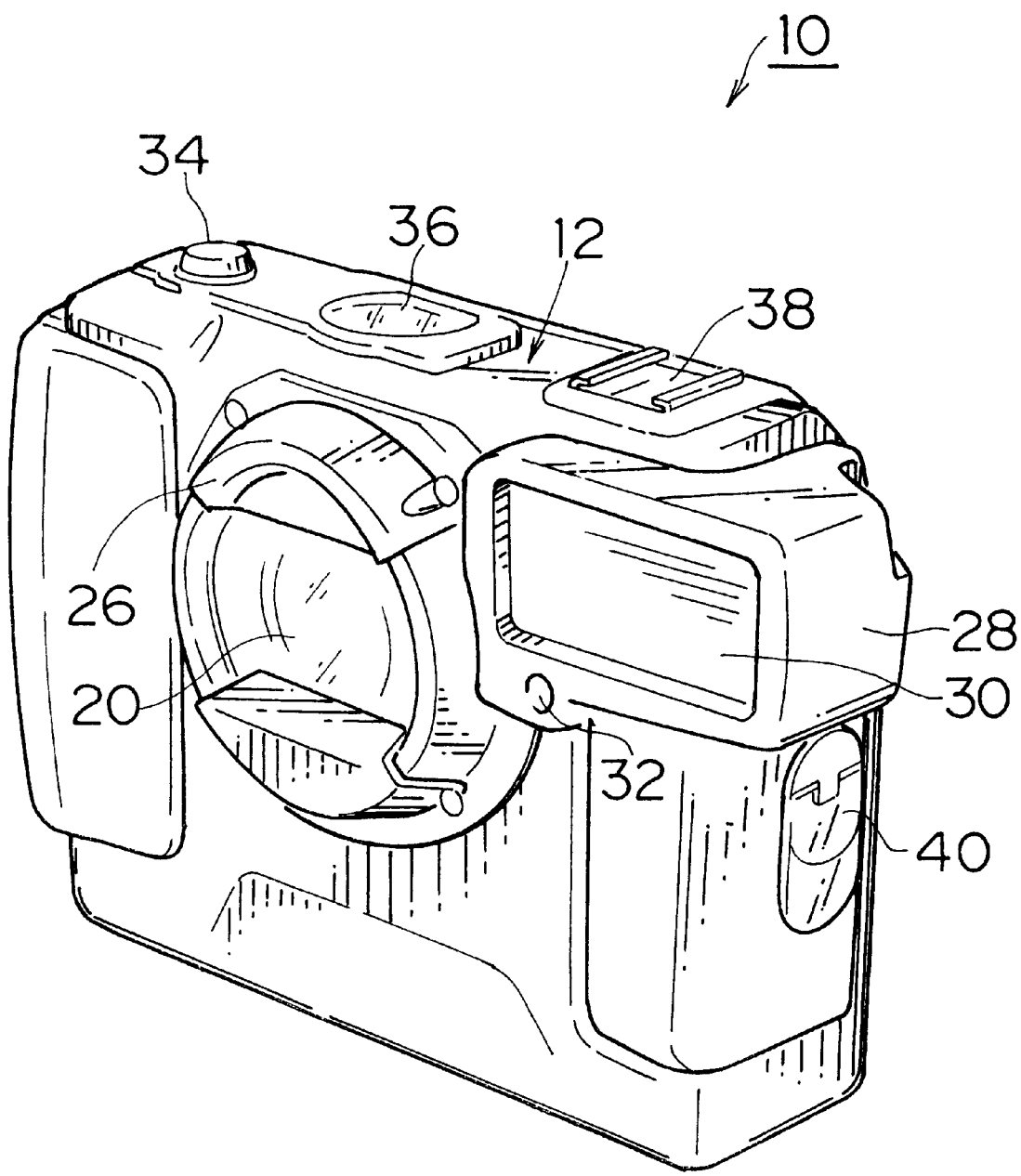

F I G. 2
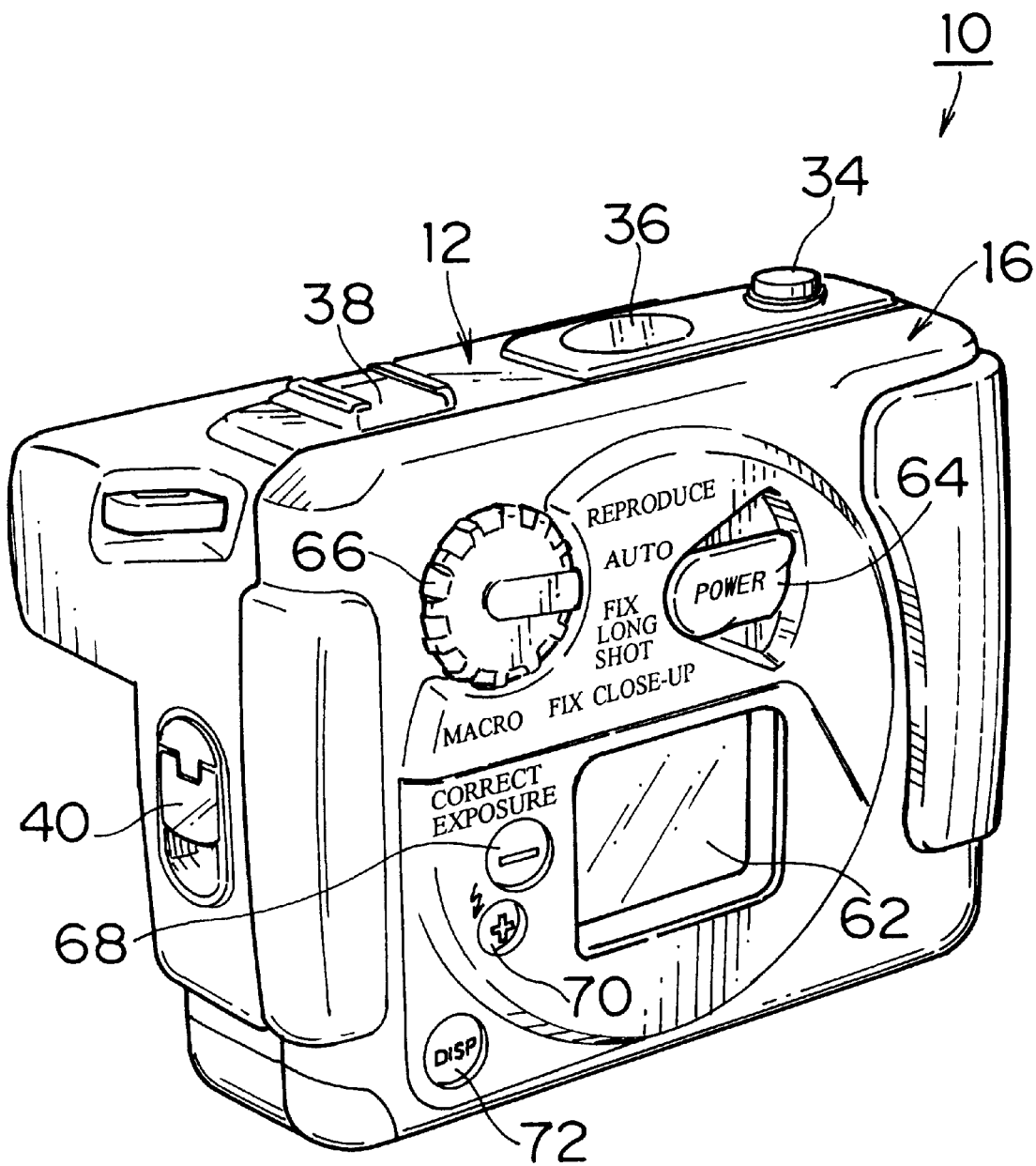

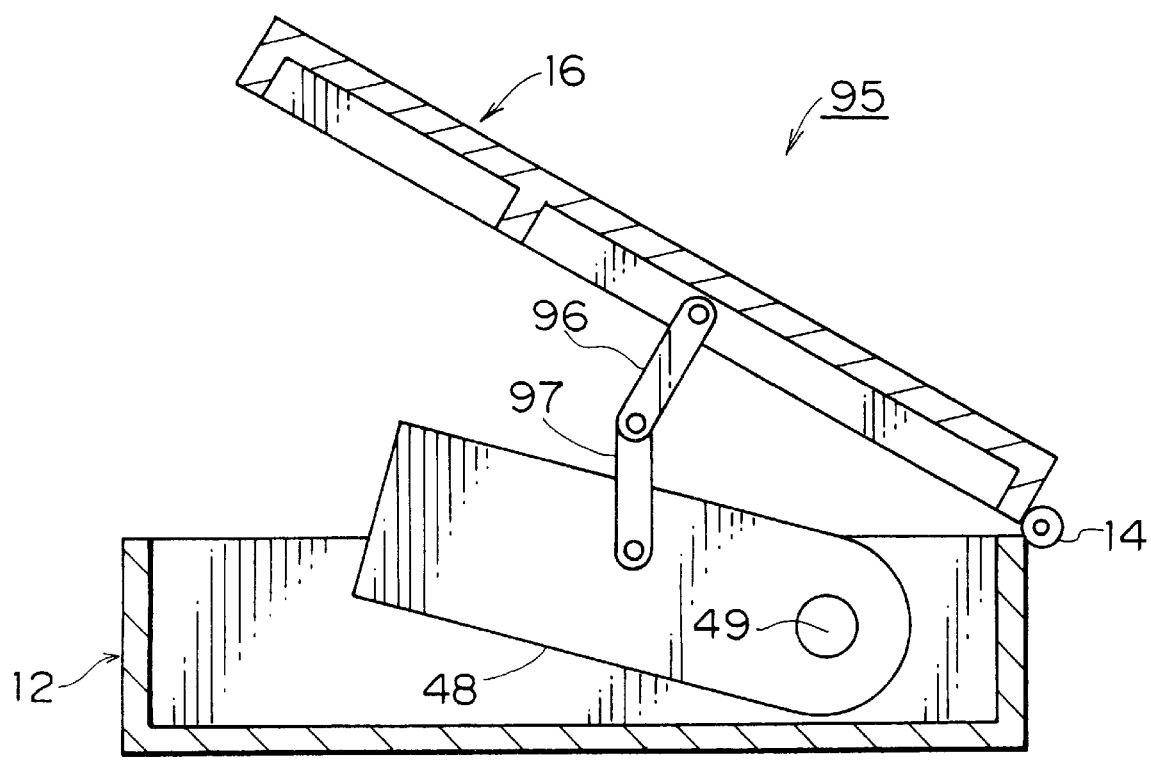

F I G. 1 1
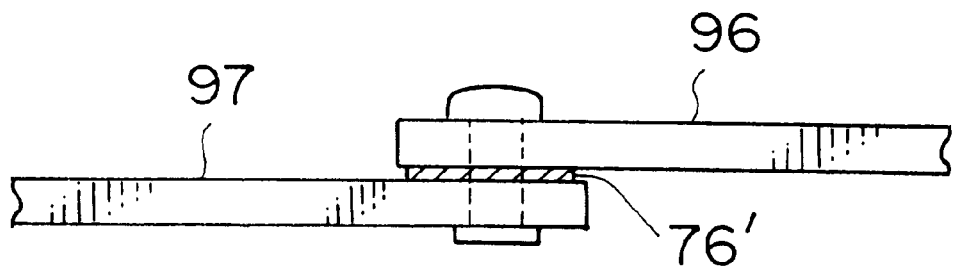
F I G. 1 2
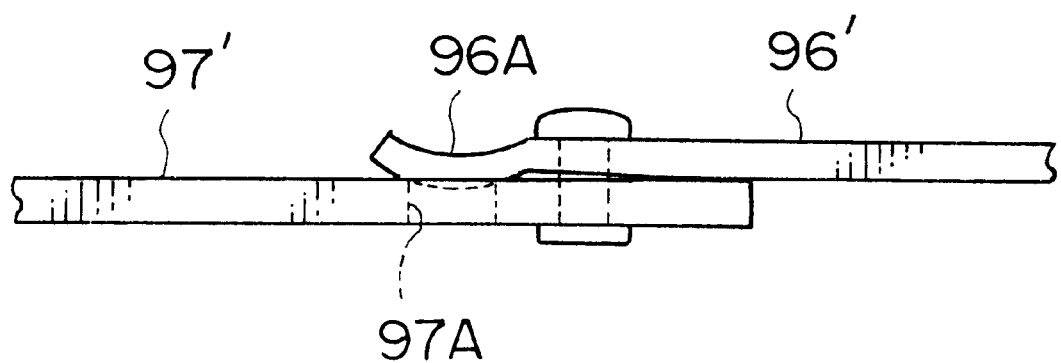

F I G. 1 4
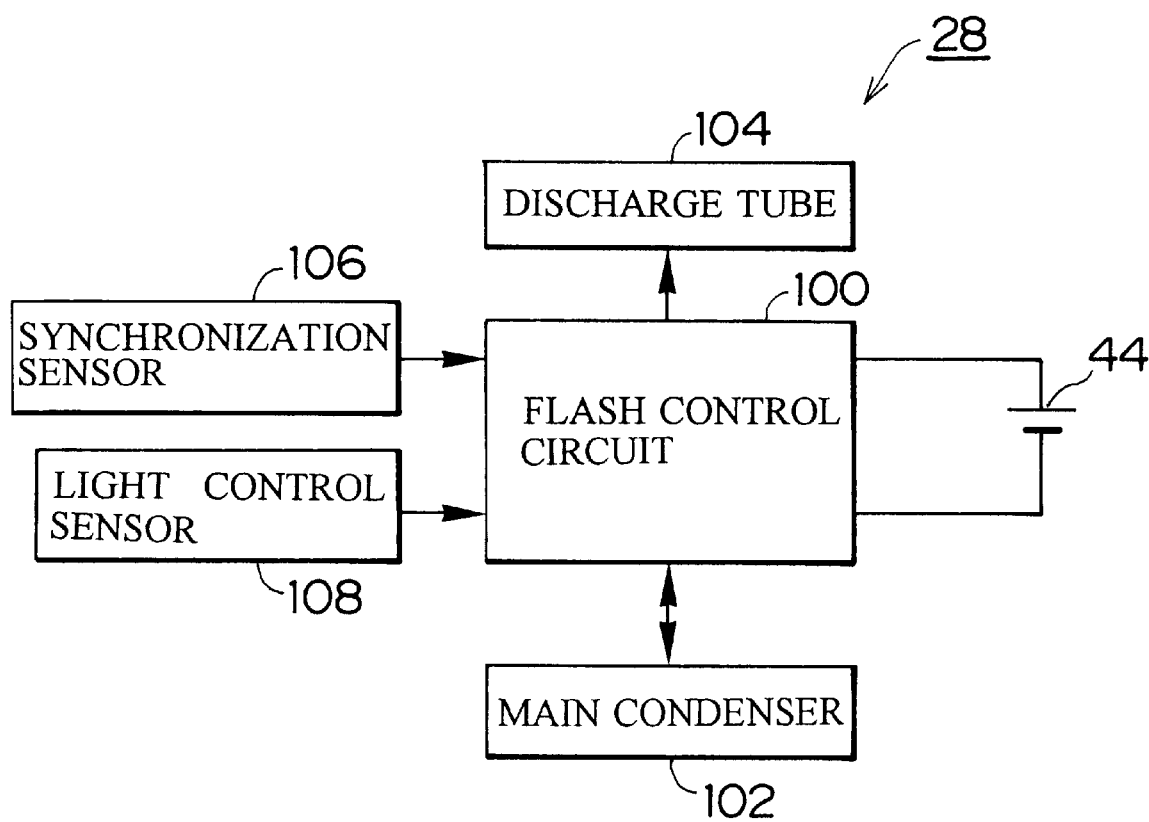

WATERPROOF CASE FOR CAMERA

BACKGROUND OF THE INVENTION

1. Field of the Invention

The present invention relates generally to a waterproof case for a camera, and more particularly to a waterproof case for containing a digital camera, a silver halide camera, etc. to function as a waterproof camera.

2. Description of Related Art

A conventional waterproof case for a camera comprises a case body, which contains the camera, and a lid, which is attached to the case body by an opening and closing mechanism such as a buckle. The lid is completely detached from the case body or the lid is fully opened, when the camera is attached to and detached from the case body.

According to the conventional waterproof case, the recording mediums such as memory cards and film are exchanged and the batteries of the camera are replaced and charged in the state wherein the camera is completely taken out from the waterproof case.

Since the lid is removed from the case body, it is necessary to provide a space for placing the removed lid. Thus, the conventional waterproof case is inconvenient when the camera is attached and detached to the waterproof case outdoors. The waterproof case, which is constructed so that the lid cannot be separated from the case body, has a disadvantage in that the lid is not steadily attached to the case body (the lid is swaying) when the lid is opened. It is therefore difficult to attach and detach the camera and exchange the recording mediums of the camera in the waterproof case.

Moreover, when the recording mediums of the camera are exchanged and the batteries of the camera are replaced and charged, there is a problem in that the camera must be taken out from the conventional waterproof case or the exchange, etc. cannot be performed smoothly if the camera is contained in the waterproof case.

A digital camera, which has multiple functions and achieves a high-quality image, has become widely known recently. A compact digital camera is desired to be heavy-duty since it is expected to be used under bad conditions (outdoors, at a construction site, in the water, etc.). Under such bad conditions, a wide-angle shot is required in addition to the waterproofing, the dustproofing, etc.

There is a conventional camera which is constructed in such a manner that a video camera is contained in a housing including a lid, which is made of transparent plastic so that it can be used in the water. This camera is assembled by the use of a packing so that the camera can be closed tightly to shut out the water. This waterproof camera is provided with an air lens, which is attached to the housing to permit the wide-angle shot and functions in the same manner as a wide conversion lens (Japanese Utility Provisional Publication No. 5-18173). There is another conventional waterproof camera in which a wide conversion lens is attached to the end of a lens barrel of a waterproof camera body (Japanese Patent Provisional Publication No. 7-92537).

The wide conversion lens, which is attached to the conventional waterproof camera, is attached to the front of the housing or to the end of the lens barrel of the waterproof camera. For this reason, the wide conversion lens is not heavy-duty, and it is damaged easily.

Since the wide conversion lens is attached to the outside of the waterproof camera or the case body, the lens is usually large so as not to reduce a shot area, the conventional waterproof camera is difficult to carry and the lens may be broken or lost if the lens is detached from the camera or the case.

There is another conventional waterproof case, which contains a built-in flash camera and activates a flash device built in a camera body when shooting with the flash (Japanese Patent Provisional Publication No. 6-167740). There is yet another waterproof camera, which is provided with a waterproof flash at the outside thereof and activates the waterproof flash in synchronism with a flash built in the camera (Japanese Utility Model Provisional Publication No. 7-1437). According to another waterproof camera, a waterproof flash is electrically connected to a waterproof camera body through a synchronization-cable so that a shooting with the flash can be performed in the water (Japanese Patent Provisional Publication No. 7-64159).

If the built-in flash camera, which is housed in the waterproof case, can be used under bad conditions (outdoors, at a construction site, in the water, etc.) The built-in flash camera, however, is not suitable for the shooting with the flash since the built-in flash device emits light of a relatively small quantity so that the camera can be compact.

On the other hand, some waterproof flashes, which are provided independently of the waterproof camera, can emit light of a large quantity; however, it is complicated to attach the waterproof flash to the waterproof camera and wire a connection cable used for the synchronization with the waterproof camera. The waterproof structure of the connection cable is complicated, too.

SUMMARY OF THE INVENTION

An object of the present invention is to provide a waterproof case for a camera, which makes it possible to easily exchange recording mediums of the camera and replace and charge a battery of the camera without taking out the camera completely from the waterproof case and eliminates a possibility that the lid obstructs the attachment and detachment of the camera.

Another object of the present invention is to provide a waterproof case for a camera, which is heavy-duty and prevents an accessory optical member such as a wide conversion lens from being damaged, and which makes the accessory optical member compact.

Yet another object of the present invention is to provide a waterproof case for a camera, which is suitable for a shooting with a flash under bad conditions and is easy to operate.

To achieve the above-mentioned object, the present invention is directed to a waterproof case for a camera, comprising: a case body for containing the camera, the case body having an opening; a lid for closing the opening of the case body watertightly, the lid being hinged to the case body; and a means for holding the lid open at either one of an arbitrary angle and a predetermined angle with respect to the opening of the case body. Another embodiment of the present invention comprises: a case body for containing the camera, the case body having an opening; a lid for closing the opening of the case body watertightly, the lid being movably attached to the case body; and a means for moving the camera contained in the case body to a predetermined position upon opening of the lid.

According to the present invention, the lid is held stationary at the predetermined opening angle regardless of the weight thereof, and the lid cannot obstruct the attachment and detachment of the camera. When the lid is opened, the camera moves automatically to the predetermined position on the waterproof case. It is therefore possible to easily exchange the recording mediums of the camera, and replace and charge the battery of the camera even if the camera is not completely detached from the case body. The lid holding means includes one of the following: a click-stop mechanism for engaging on at least one rotational position of the lid; a means for providing predetermined friction to rotation of the lid; and a lock mechanism for locking the rotation of the lid on at least one rotational position of the lid. The camera moving means comprises: a camera attachment member arranged movably within the case body and provided with a camera attachment screw to be screwed into a tripod screw hole of the camera; and a means for pressing the camera attachment member to protrude the camera from the opening of the case body. The camera moving means may have a stopper for temporarily stopping the camera attachment member at a position permitting exchange of recording mediums for the camera. Another embodiment of the camera moving means comprises: a camera attachment member arranged movably within the case body and provided with a camera attachment screw to be screwed into a tripod screw hole of the camera; and a link mechanism provided between the camera attachment member and the lid.

To achieve the above-mentioned object, the present invention is directed to a waterproof case for a camera, comprising: a case body for containing the camera; and an attachment part arranged in the case body to face a taking lens of the camera contained in the case body, an accessory optical member being attached to and detached from the attachment part. Another embodiment of the present invention comprises: a case body for containing the camera; and an accessory optical member arranged in the case body to face a taking lens of the camera contained in the case body.

According to the present invention, the accessory optical member is detachably arranged at the inside of the waterproof case or is fixed to the inside of the waterproof case, so that the accessory optical member can be protected by the waterproof case. The waterproof case of the present invention prevents the accessory optical member from being damaged and shuts out the water, etc., and thus, the waterproof case with the accessory optical member is heavy-duty. Moreover, since the accessory optical member can be close to the taking lens of the camera, the accessory optical member can be compact. The accessory optical member is a wide conversion lens, a telephoto conversion lens or a filter.

To achieve the above-mentioned object, the present invention is directed to a waterproof case for a camera, comprising: a case body for containing the camera; a first flash device arranged in the case body, the first flash device comprising a means for synchronizing flashing of the first flash device with shooting of the camera contained in the case body; and a battery for supplying electric power to the first flash device, the battery being arranged in the case body. The camera has a second flash device, which emits light of smaller quantity than the first flash device.

The first flash device is not restricted by the size of the camera, etc, because it is provided inside the waterproof case. The first flash device can emit light of large quantity, and thus, it is suitable for the shooting with the flash under bad conditions. Moreover, a special battery is provided in the waterproof case to supply the power to the first flash device, which emits a large quantity of light.

The waterproof case is characterized in that the case body has an opening; a lid for closing the opening of the case body watertightly is hinged to the case body; and the case body comprises a camera receiving part for containing the camera and a battery receiving part for containing the battery, the battery receiving part being arranged opposite to a part at which the lid is hinged, across the camera receiving part. For this reason, it is easy to replace the batteries.

The second flash device emits light upon the shooting of the camera using the first flash the quantity of the light emitted from the second flash device when the camera is contained in the waterproof case being smaller than quantity of light emitted from the second flash device when the camera is used separately from the waterproof case; and the synchronizing means comprises a photodetector for sensing the light emitted from the second flash device, the synchronizing means activating the first flash device upon the sensing of the photodetector. Specifically, the first flash device is complete within the waterproof case, and the flash device itself does not have to be waterproof. There is no necessity of connecting a synchronization-cable for the synchronization with the camera. The flash device may have a means for controlling quantity of light emitted from the first flash device, the controlling means comprising a photodetector and stopping the first flash device from flashing when quantity of light received by the photodetector reaches a predetermined quantity.

BRIEF DESCRIPTION OF THE DRAWINGS

The nature of this invention, as well as other objects and advantages thereof, will be explained in the following with reference to the accompanying drawings, in which like reference characters designate the same or similar parts throughout the Figures and wherein:

FIG. 1 is a perspective view of a waterproof case for a camera according to an embodiment of the present invention, which is taken from the front;

FIG. 2 is a perspective view of the waterproof case in FIG. 1, which is taken from the back;

FIG. 10 is a sectional view illustrating the essential parts of another waterproof case;

FIG. 11 is a view of assistance in explaining a friction means between links in FIG. 10;

FIG. 12 is a view showing an example of a click-stop mechanism provided at the links in FIG. 10, etc.;

FIG. 14 is a block diagram illustrating an outline of a flash device built in the waterproof case.

DETAILED DESCRIPTION OF THE PREFERRED EMBODIMENT

This invention will be described in further detail by way of example with reference to the accompanying drawings.

Figure 3:
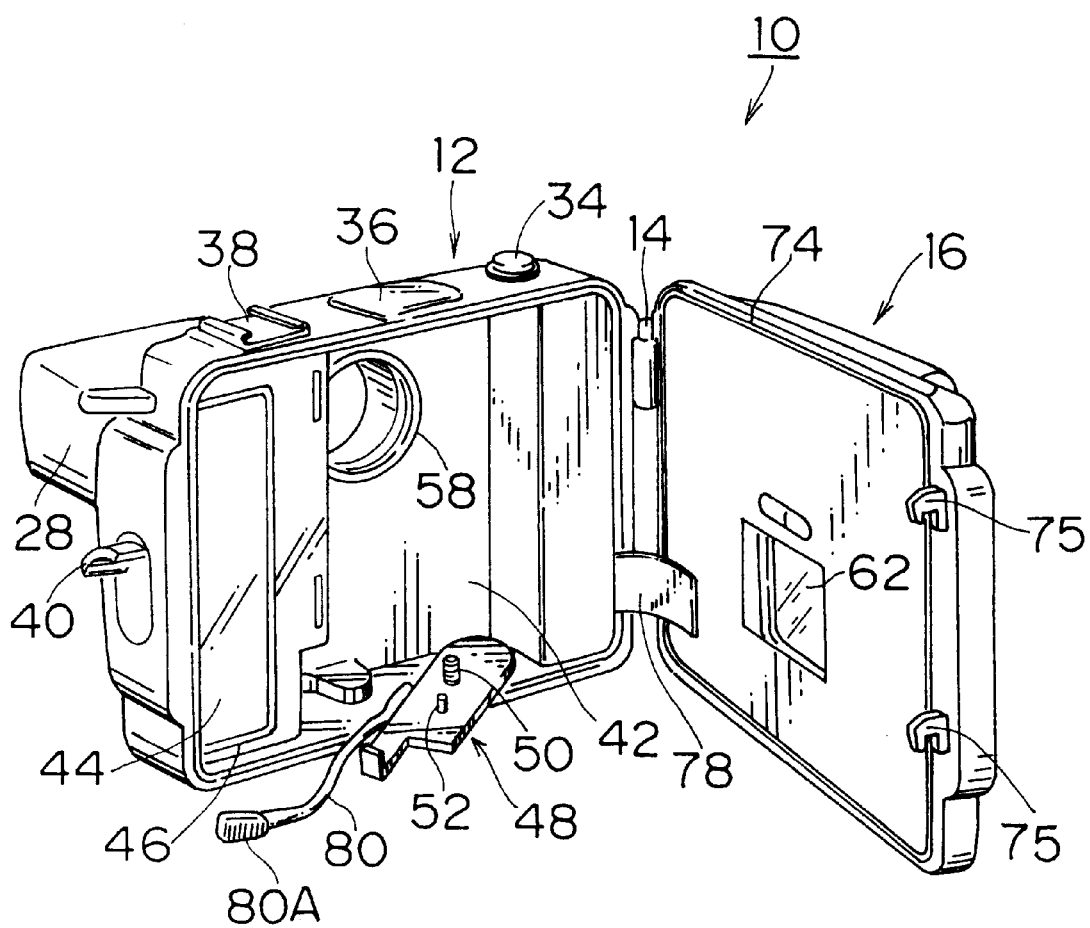
FIG. 3 is a perspective view illustrating the state where a lid of the waterproof case in FIG. 2 is opened.

FIGS. 1 and 2 are perspective views illustrating a waterproof case for a camera according to an embodiment of the present invention when the waterproof case is seen from the front and the back, respectively. FIG. 3 is a perspective view illustrating the state wherein a lid for the waterproof case in FIG. 2 is opened.

Figure 4:
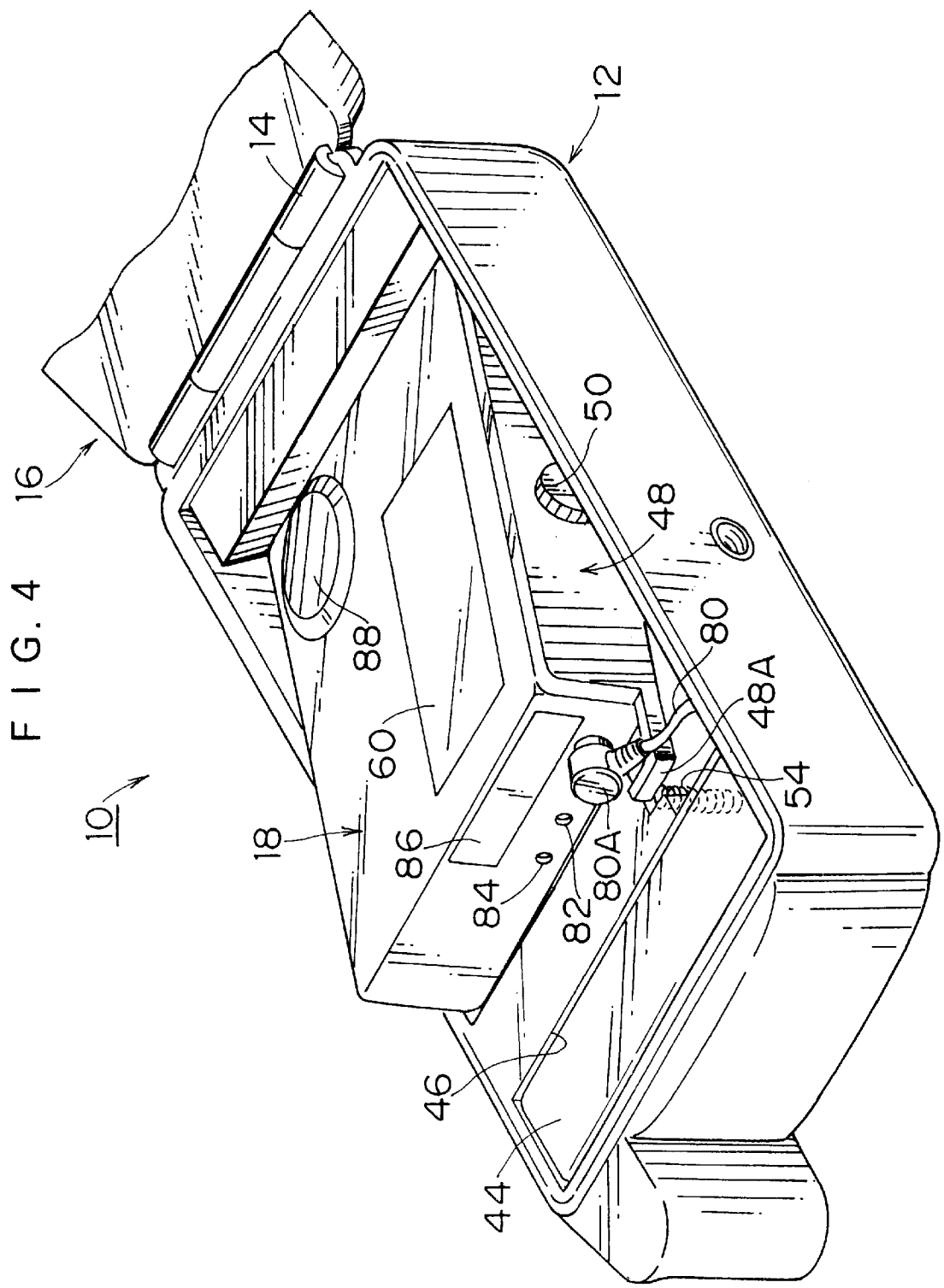
FIG. 4 is a perspective view illustrating the state where a digital camera is contained in a case body of the waterproof case and the lid is opened.

As shown in FIGS. 1–3, the waterproof case 10 comprises a case body 12, and a lid 16, which is rotatably attached to the case body 12 through a hinge 14. If a digital camera 18 is contained in the waterproof case 10 as shown in FIG. 4, the waterproof case 10 with the digital camera 18 functions as a waterproof digital camera.

Figure 5:
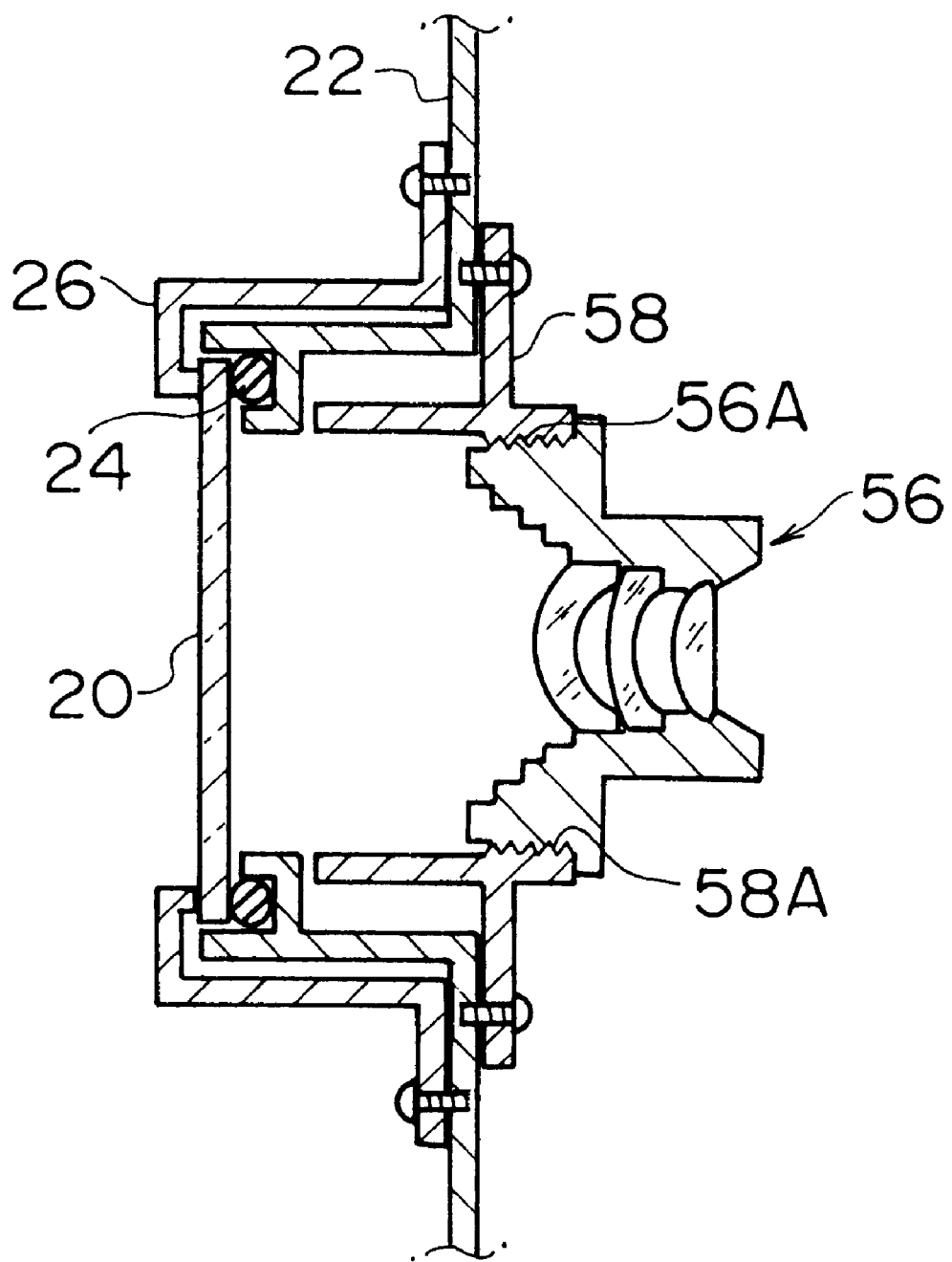
FIG. 5 is a sectional view illustrating the essential parts of the case body for assistance in explaining the structure of an attachment part for a wide conversion lens, etc.

As shown in FIG. 1, a protective glass 20 is fixed watertightly to the front of the case body 12 in such a way as to face the taking lens of the digital camera 18. Specifically, as shown in FIG. 5, an O-ring 24 is arranged between the protective glass 20 and a casing 22 of the case body 12. The protective glass 20 is pressed against the O-ring 24 by a pressing member 26 fixed to the casing 22.

A light emission window 30 of a flash device 28, which is built in the case body 12, and a light receiving window 32 of a light control sensor for adjusting the quantity of emitted light are provided at the front of the case body 12.

A release button 34, a transparent window part 36 through which a liquid crystal display (LCD) panel showing the state of the digital camera 18 is seen, and an attachment shoe 38 for attaching a waterproof optical finder (not illustrated) are provided at the top of the case body 12. A lid-opening tab 40 is provided at the right side of the case body 12 in FIG. 1.

As shown in FIG. 3, a camera receiving part 42 for containing the digital camera 18, and a battery receiving part 46 for containing a battery 44, which is a special secondary battery or a battery case for containing a plurality of batteries, used as a power source for the waterproof case 10 are formed inside the case body 12.

A camera attachment member 48 for attaching the digital camera 18 is rotatably attached to the inside surface of case body 12. The camera attachment member 48 has an attachment screw 50 to be screwed into a tripod screw hole of the digital camera 18, and a pin 52, which prevents the rotation of the digital camera 18 and positions the digital camera 18. The digital camera 18 is fixed by the camera attachment screw 50 and the pin 52 as shown in FIG. 4. An engaging part 48A, which contacts with the top end of a coil spring 54 arranged in the case body 12, is formed at the end of the camera attachment member 48 (see FIGS. 4 and 6).

Figure 6:
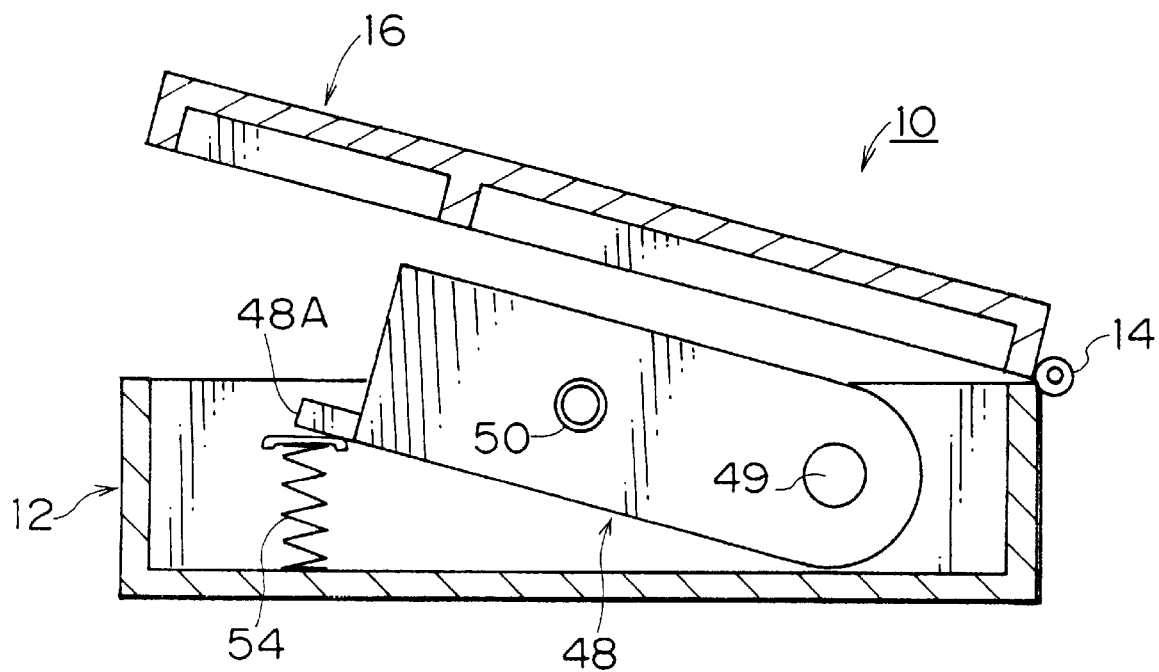
FIG. 6 is a sectional view illustrating the essential parts of the waterproof case.

When the lid 16 is opened, the coil spring 54 presses the end of the camera attachment member 48 to a position shown in FIGS. 4 and 6. Specifically, when the lid 16 is opened, the camera attachment member 48 rotates automatically about a rotary shaft 49 in FIG. 6 due to the force of the coil spring 54, and the camera attachment member 48 moves the digital camera 18 up to a predetermined position.

An attachment part 58 to which a wide conversion lens 56 is attached is provided inside the case body 12 as shown in FIGS. 3 & 5. Specifically, the attachment part 58 is fixed inside the casing 22 of the case body 12, and a female screw 58A, which engages with a male screw 56A formed on the outer circumference of the wide conversion lens 56, is formed at the attachment part 58. The attachment of the wide conversion lens 56 to the attachment part 58 makes possible a wider-angle shot than the normal shot.

As shown in FIG. 2, a transparent window part 62 for seeing through an LCD monitor 60 (see FIG. 4), which is provided at the back of the digital camera 18 to show captured images, reproduced images, etc.; a power switch 64; a mode dial 66; an exposure correction button 68; a flash button 70; and a display button 72 are provided at the back of the lid 16.

As shown in FIG. 3, a waterproof packing 74, hooks 75 for locking the lid 16 when the lid 16 is closed, etc. are provided inside the lid 16. The lid 16 is openably attached to the waterproof case 12 through the hinge 14 as mentioned previously. When the lid 16 is closed, the hooks 75 engage with engaging parts (not illustrated) on the case body 12, and the packing 74 maintains the watertightness in the case body 12. When the lid 16 is locked, the lock of the lid 16 is released by raising the lid-opening tab 40 as shown in FIG. 3 and rotating it counterclockwise.

Figure 7:
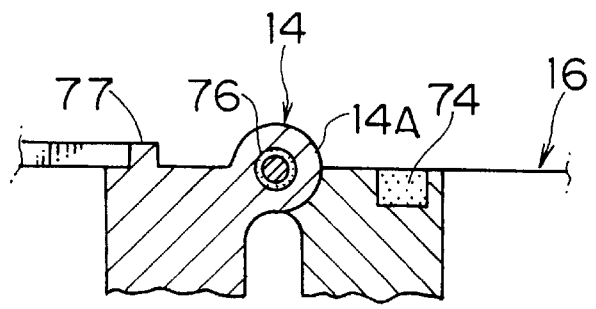
FIG. 7 is a sectional view illustrating the essential parts of the waterproof case including a hinge.

FIG. 7 is a sectional view illustrating the waterproof case 10 including the hinge 14. As shown in FIG. 7, a friction member 76 is arranged at the circumference of a shaft 14A of the hinge 14, and a frictional force of the friction member 76 holds the lid 16 at an arbitrary angle regardless of the weight of the lid 16. The friction member 76 may be made of the same material as the packing 74 provided at the lid 16 so that the circumference of the shaft 14A of the hinge 14 can be waterproofed. Reference numeral 77 in FIG. 7 indicates a projecting part formed in the case body 12 with which the packing 74 of the lid 16 contacts.

A mode dial 66 and a variety of buttons provided at the back of the lid 16 are connected to a control circuit (not illustrated) through a flexible wiring 78 shown in FIG. 3. The release button 34 provided at the top of the case body 12 is also connected to the control circuit. The control circuit outputs a control signal to the digital camera 18 through a control cable 80 in accordance with the operation of the buttons. The control cable 80 has a plug 80A, which is inserted into a digital input/output terminal of the digital camera 18 as shown in FIG. 4.

In FIG. 4, reference numeral 84 indicates a video output terminal, 84 is a DC input terminal, 86 is a smart medium lid for opening and closing an inlet for a smart medium (a memory card), and 88 is a mode dial at the digital camera.

A description will be given of the control for the digital camera 18 in accordance with the operation of the buttons.

Sliding the power switch 64 upward in FIG. 2 turns on the power of the digital camera 18, and re-sliding the power switch 64 upward turns off the power of the digital camera 18. The mode dial 66 is used to select one of the following modes in accordance with the rotational position of the dial: a reproduction mode for reproducing a recorded image, a normal (AUTO) image-capturing mode for automatically controlling the exposure and focusing in accordance with the shooting conditions, a long shot fixed image-capturing mode for fixing a focus at a long distance (approximately 5 m), a close-up fixed image-capturing mode for fixing a focus at a short distance (approximately 1.2 m), and a macro image-capturing mode for a close shot of 10–70 cm.

When the release button 34 is half pressed while the exposure correction button 68 is pressed, the exposure correction of +1.6 Ev is performed. The flash device 28, which is built in the case body 12, is normally in an automatic mode for automatically emitting light at a low brightness or in backlight. Every time the flash button 70 is pressed, the flash device 28 is changed from the automatic mode to a compulsory emission mode, an emission stop mode, and the automatic mode in that order. The exposure correction button 68 and the flash button 70 are also used to give an instruction to switch reproduced images forward and backward frame-by-frame basis in the reproduction mode. If the display switch 72 is pressed when the AUTO image-capturing mode is selected by the mode dial 66, a captured image is shown on the LCD monitor 60 so that the cameraman can perform the image-recording while looking at the LCD monitor 60.

A description will be given of the operation of the waterproof case 10, which is constructed in the above-mentioned manner.

To put the digital camera 18 into the waterproof case 10, the digital camera 18 is fixed to the camera attachment member 48 in FIG. 3 through the camera attachment screw 50 and the pin 52. Then, the plug 80A of the control cable 80 is inserted into the digital input/output terminal of the digital camera 18 as shown in FIG. 4. If the control cable 80 is short, the digital camera 18 is put in the waterproof case 10 as shown in FIG. 4 or 6, and the plug 80A is inserted into the digital input/output terminal.

Then, the lid 16 is turned to close in the state wherein the digital camera 18 is inclined (in other words, the digital camera 18 is pressed up to the predetermined position by the force of the coil spring 54), until the hooks 75 of the lid 16 engage with the engaging parts of the case body 12 (until the hooks 75 click).

With the closing action of the lid 16, the digital camera 18 is pressed down against the force of the coil spring 54 and is placed at a predetermined position in the camera receiving part 42 of the case body 12. Since the digital camera 18 is pressed toward the lid 16 by the force of the coil spring 54, the digital camera 18 will not become loose in the camera receiving part 42.

On the other hand, to charge a battery (not illustrated) in the digital camera 18 contained in the waterproof case 12 or exchange the smart mediums in the digital camera 18, the lid opening tab 40 is raised as shown in FIG. 3 and is rotated counterclockwise to release the lock of the lid 16. When the lock of the lid 16 is released and the lid 16 is opened, the camera attachment member 48 rotates automatically about the rotary shaft 49 due to the force of the coil spring 54 as shown in FIG. 4 or 6. Consequently, the digital camera 18 is moved to a position represented in FIG. 4 or 6. As shown in FIG. 4, the digital camera 18 is positioned stationary in the inclined state while one side of the digital camera 18 (the side provided with the digital input/output terminal, the video output terminal 82, the DC input terminal 84 and the smart medium lid 86) protrudes from the case body 12.

Hence, the following variety of operations can be performed in the state of FIG. 4 without taking the digital camera 18 out completely from the waterproof case 10. The battery in the digital camera 18 can be charged by an AC power adapter (not illustrated) of which plug is connected to the DC input terminal 84 of the digital camera 18. The smart mediums can be exchanged by opening the smart medium lid 86. The digital camera 18 can output video signals to a monitor TV, etc. through a video cable (not illustrated) of which plug is connected to the video output terminal 82. The digital camera 18 can input/output digital signals to a personal computer through a cable of which plug is connected to the digital input/output terminal instead of the plug 80A of the control cable 80.

To take the digital camera 18 out completely from the waterproof case 10, the plug 80A of the control cable 80 is disconnected in the state shown in FIG. 4 or 6, and the camera attachment member 48 (the digital camera 18) is rotated manually at least to a position where the camera attachment screw 50 can be operated. Then, the camera attachment screw 50 is unscrewed, and the digital camera 18 is detached from the camera attachment member 48.

The attachment and detachment of the plugs of the cables, the exchange of the smart mediums, and the attachment and detachment of the digital camera 18 can be performed in a stable condition without such an obstacle as the lid 16, because the lid 16 is held stationary at an arbitrary angle due to the friction of the friction member 76 as described with reference to FIG. 7. The lid 16 is usually opened after drops of water are wiped, but a guide groove, etc. for drops of water may be formed around the lid 16 so as to prevent the drops of water adhered to the lid 16 from getting into the waterproof case 12.

FIGS. 8, 9, 10 and 13 are sectional views illustrating the essential parts of waterproof cases according to other embodiments of the present invention.

Figure 8:
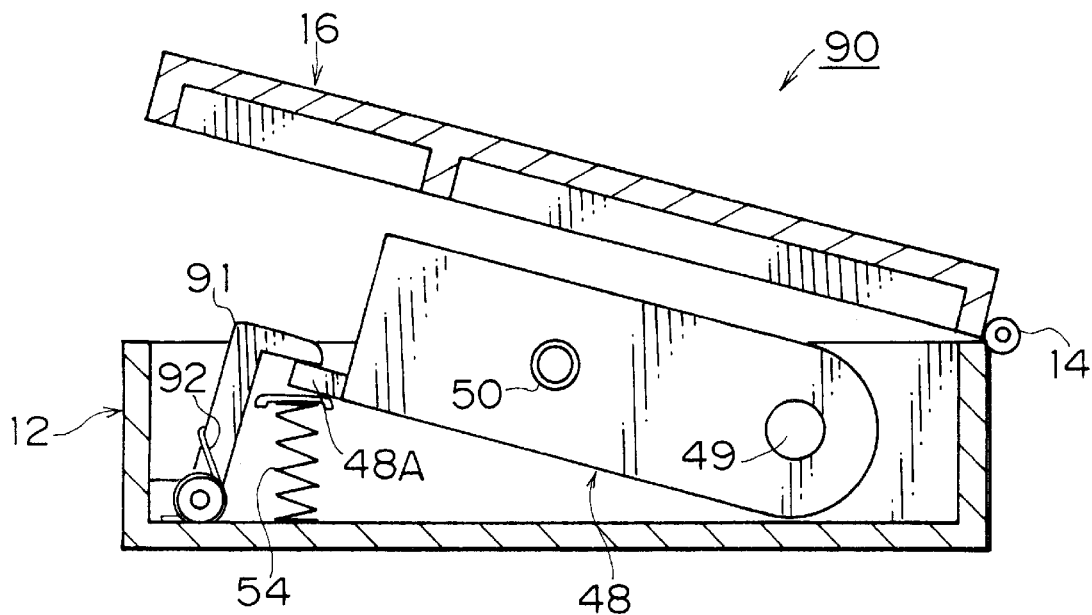
FIG. 8 is a sectional view illustrating the essential parts of another waterproof case.

A waterproof case 90 in FIG. 8 is different from the waterproof case 10 in FIG. 6 in that the waterproof case 90 is provided with a stopper 91, which temporarily stops the rotation of the camera attachment member 48. In FIG. 8, parts similar to those described with reference to FIG. 6 are denoted by the same reference numerals, and they will not be described here.

The stopper 91 is pressed clockwise in FIG. 8 by a torsion spring 92, and the stopper 91 is capable of engaging with the engaging part 48A of the camera attachment member 48. When the lid 16 is opened, the camera attachment member 48 rotates clockwise about the rotary shaft 49 due to the force of the coil spring 54, and the engaging part 48A of the camera attachment member 48 engages with the stopper 91, which stops the rotation of the camera attachment member 48. In other words, the stopper 91 holds the camera attachment member 48 and the camera 18 at a predetermined rotational position (indicated in FIG. 8). It is therefore possible to attach and detach the plugs of the above-mentioned cables, exchange the smart mediums, or the like in a stable condition.

In order to further rotate the camera attachment member 48 clockwise in FIG. 8, the stopper 91 is rotated counterclockwise against the force of the torsion spring 92.

Figure 9:
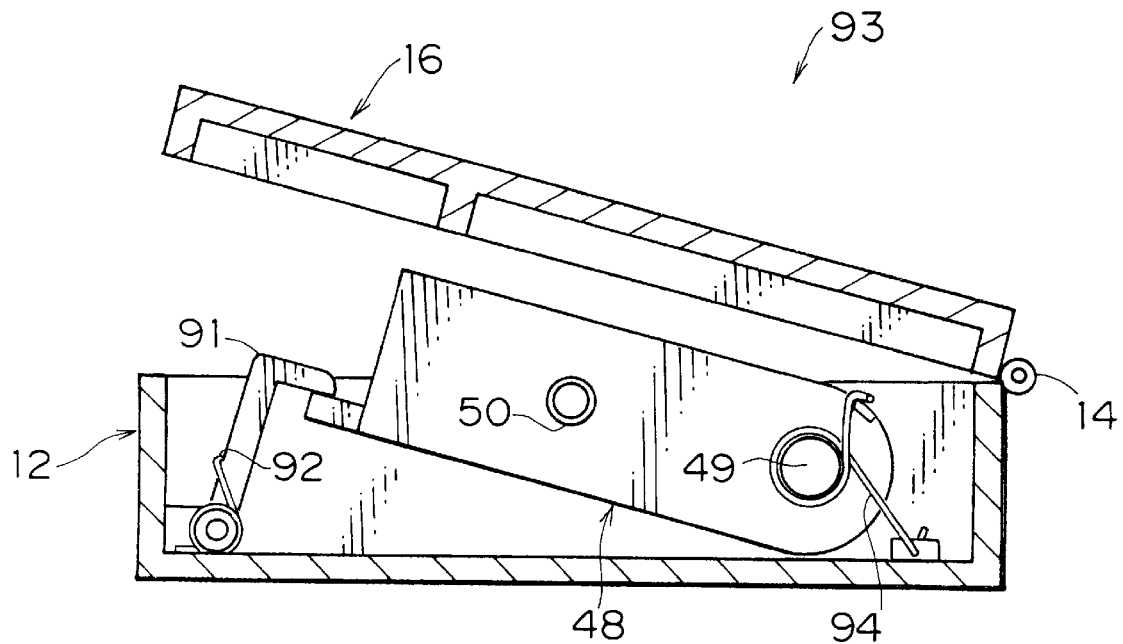
FIG. 9 is a sectional view illustrating the essential parts of another waterproof case.

A waterproof case 93 in FIG. 9 is different from the waterproof case 90 in FIG. 8 in that a torsion spring 94 is arranged around the rotary shaft 49 instead of the coil spring 54.

When the lid 16 is opened, the camera attachment member 48 rotates clockwise about the rotary shaft 49 due to the force of the torsion spring 94, and the stopper 91 stops the rotation of the camera attachment member 48. When the stopper 91 is rotated counterclockwise, the camera attachment member 48 rotates further clockwise in FIG. 9 due to the force of the torsion spring 94.

A waterproof case 95 in FIG. 10 is different from the waterproof case 10 in FIG. 6 in that links 96 & 97 instead of the coil spring 54 are arranged between the lid 16 and the camera attachment member 48.

When the lid 16 is opened, the lid 16 transmits a rotational force to the camera attachment member 48 through the links 96 & 97. The camera attachment member 48 also rotates with the opening of the lid 16. If the hand is removed from the lid 16 after the lid 16 is rotated at an arbitrary angle, the rotational position of the camera attachment member 48 is maintained by the friction member 76 (see FIG. 7) provided at the hinge 14.

As shown in FIG. 11, a friction member 76' may be provided between the links 96 & 97 instead of the friction member 76 provided at the hinge 14, and a friction member may also be provided at the rotary shaft 49 of the camera attachment member 49.

It is also possible to provide a click-stop mechanism, which engages on at one or more rotational positions of the camera attachment member 48, instead of the friction member 76' in FIG. 11. In the click-stop mechanism, an elastic convex part 96A is formed in the link 96', and one or more concave parts 97A, on which the convex part 96A engages, are formed in the link 97' as shown in FIG. 12. When the link 96' and the link 97' form a predetermined angle, the convex part 96A is placed on the concave part 97A. The click-stop mechanism, however, should not be restricted to this. The click-stop mechanism may be provided instead of the friction member 76 provided at the hinge 14, and it may also be provided at the rotary shaft 49 of the camera attachment member 48.

Figure 13:
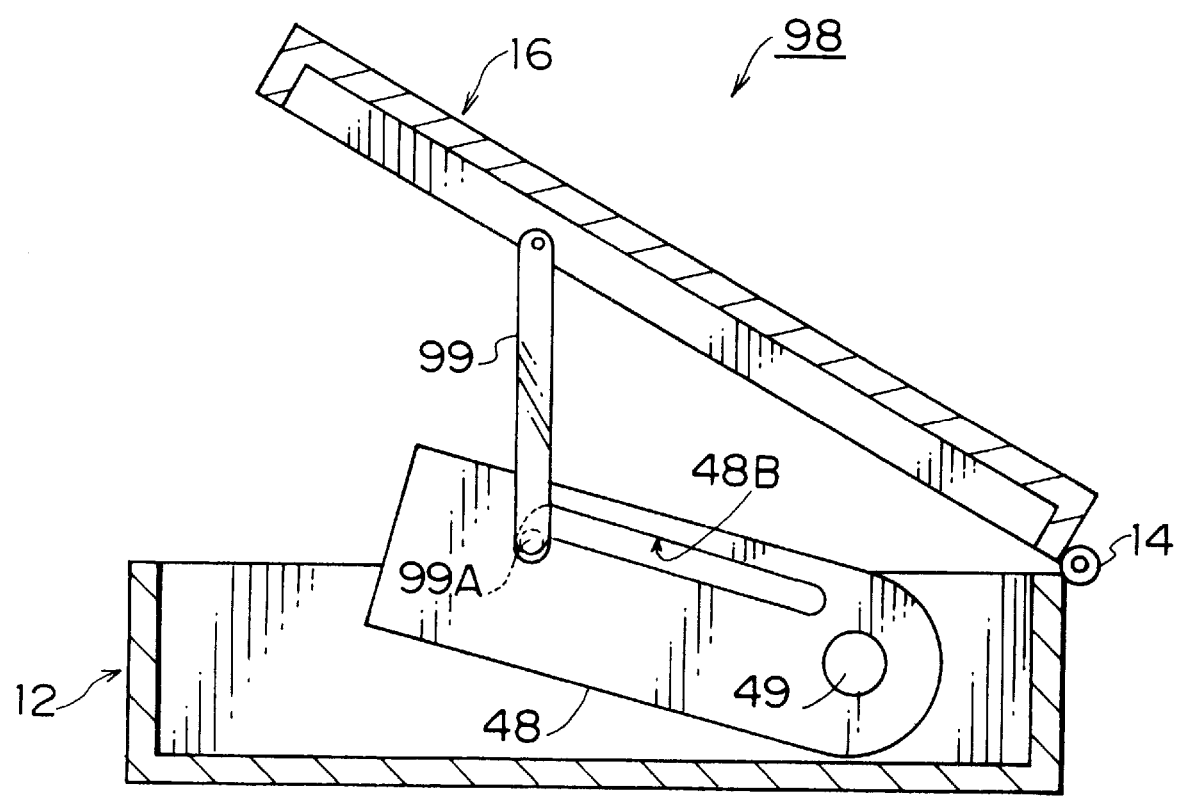
FIG. 13 is a sectional view illustrating the essential parts of another waterproof case.

A waterproof case 98 in FIG. 13 is different from the waterproof case 95 in FIG. 10 in that a link 99 is provided instead of the links 96 & 97 and a guide groove 48B for guiding one end 99A of the link 99 is provided.

The guide groove 48B is formed in the camera attachment member 48, and a concave part is formed at one end of the guide groove 48B. The end 99A of the link 99 can engage with the concave part. When the lid 16 is opened, the end 99A of the link 99 moves toward the concave part along the guide groove 48B and rotates the camera attachment member 48. When the end 99A reaches a position indicated in FIG. 13 and the hand is removed from the lid 16 at this position, the end 99A is placed on the concave part and keeps the rotational position of the camera attachment member 48. When the lid 16 is opened further from the position indicated in FIG. 13, the end 99A returns rightward along the guide groove 48B and further rotates the camera attachment member 48. The rotary shaft 49 of the camera attachment member 48 is provided with a friction member, which keeps a position where the camera attachment member 48 reaches as a result of the rotation with the opening and closing actions of the lid 16.

In these embodiments, the camera attachment member is rotatably attached to the case body through the rotary shaft, but the present invention should not be restricted to this. The camera attachment member may also be slidably arranged so that the digital camera can move parallel to the camera receiving part. The camera contained in the camera receiving part is not restricted to the digital camera, and it may also be a silver halide camera. In this case, the waterproof case is constructed so that the film can be exchanged without taking the silver halide camera out completely from the waterproof case.

A description will be given of the wide-angle shooting using the waterproof case 10.

Before the digital camera 18 is put into the camera receiving part 42, the wide conversion lens 56 is attached to the attachment part 58 inside the case body 12 as shown in FIG. 5. Specifically, the male screw 56A of the wide conversion lens 56 is engaged with the female screw 58A of the attachment part 58 so that the wide conversion lens 56 can be attached to the attachment part 58.

Then, the digital camera 18 is put into the waterproof case 10 as described above. The digital camera 18 is located at a predetermined position in the camera receiving part 42 in the state wherein the digital camera 18 is received in the camera receiving part 42 of the case body 12 and the lid 16 is completely closed. Consequently, the optical axis of the wide conversion lens 56 attached to the inside of the case body 12 corresponds to the optical axis of the taking lens of the digital camera 18, permitting the wide-angle shot.

In this embodiment, the wide conversion lens 56 is attached to the attachment part 58 inside the case body 12, but the present invention is not restricted to this. Any other accessory optical members such as a telephoto-conversion lens, a neutral density (ND) filter, a ultraviolet (UV) absorbing filter, a special effect filter, etc. may also be attached to the attachment part 58 if they are used at the front of the taking lens of the camera. The accessory optical members are not necessarily attached to the attachment part by the screws, but other fixing means can be used. One of the accessory optical members may be fixed on the case body 12 instead of the attachment part 58 so as not to be detached.

A description will be given of the flash device 28, which is built in the case body 12.

FIG. 14 is a block diagram illustrating the flash device 28. As shown in FIG. 14, the flash device 28 comprises a flash control circuit 100, a main condenser 102, a discharge tube 104, a synchronization sensor 106, and a light control sensor 108.

As described previously, the flash device 28 can be changed to the automatic mode for automatically flashing under the low brightness or in backlight, the compulsory emission mode and the emission stop mode in accordance with the operation of the flash button 70. The flash device 28 is capable of emitting light of much more quantity than a flash device (not illustrated) built in the digital camera 18. The battery 44 (see FIG. 4) contained in the waterproof case 10 supplies power to the flash device 28. The battery receiving part 46, which contains the battery 44, is arranged opposite to the hinge 14 of the lid 16 across the camera receiving part 42, so that the lid 16 cannot obstruct the replacement of the battery 44.

The synchronization sensor 106 comprises a photodetector, and it is arranged in such a way as to be positioned in front of the light emission window of the flash device built in the digital camera 18 when the digital camera 18 is located at a predetermined position in the case body 12. When the flash device built in the digital camera emits light, the synchronization sensor 106 senses the emitted light and outputs a light reception signal, which is synchronous with the flashing of the flash device built in the digital camera, to the flash control circuit 100.

The digital camera 18 is able to become aware that it is contained in the waterproof case 10 by a detecting means that detects whether the pin 52 is inserted into the bottom of the digital camera 18 or not (e.g., a switch that is turned on by the presence of the pin 52). When the digital camera 18 becomes aware that it is contained in the waterproof case 10, the digital camera 18 switches to a waterproof case mode. In the waterproof case mode, the built-in flash device of the digital camera 18 emits light of minimum quantity adequate to be sensed by the synchronization sensor 106. This prevents the waste of energy and avoids a bad influence of brilliant flashes of light in the waterproof case 10. In the waterproof case mode, the digital camera 18 is able to receive the control signal through the control cable 80.

A description will be given of the operation of the flash device 28.

If the automatic mode for flashing automatically at the low brightness or in backlight is selected, and the subject brightness measured by the digital camera 18 is lower than a predetermined brightness that requires the flash, the digital camera 18 slightly flashes the built-in flash device when the release button 34 is pressed. When the flash device built in the digital camera flashes slightly, the synchronization sensor 106 of the flash device 28, which is built in the waterproof case 10, senses the slight flash. The synchronization sensor 106 outputs a light reception signal, which is synchronous with the flash of the flash device built in the digital camera, to the flash control circuit 100. On the input of the light reception signal from the synchronization sensor 106, the flash control circuit 100 outputs a trigger signal for flashing the discharge tube 104 and supplies the electric energy stored in the main condenser 102 to the discharge tube 105. When the amount of light received by the light control sensor 108, which receives the reflected light from the subject, reaches a predetermined amount, the flash control circuit 100 stops supplying the electric energy to the discharge tube 104.

In this embodiment, the synchronization sensor senses the flash of the flash device built in the camera, and the flash device built in the waterproof case flashes in synchronism therewith. The present invention, however, is not restricted to this. The camera may be electrically connected to the flash device built in the waterproof case through a synchronization-cable, and the flash device built in the waterproof case may be controlled synchronously in accordance with a control signal sent from the camera.

As set forth hereinabove, according to the waterproof case for the camera according to the present invention, the lid can be held stationary at an arbitrary opening angle or at a predetermined opening angle regardless of the weight thereof, and therefore, the lid cannot obstruct the attachment and detachment of the camera. With the opening of the lid, the camera contained in the case body protrudes automatically to the predetermined position. It is therefore possible to easily exchange the recording mediums for the camera, replace and charge the battery of the camera, attach and detach the cables, or the like without taking the camera out completely from the waterproof case.

In the waterproof case for the camera according to the present invention, the accessory optical member such as the wide conversion lens is attached to the inside of the waterproof case so that the protective glass, etc. can protect the accessory optical member. This prevents an unexpected external force from being applied to the accessory optical member, and prevents the accessory optical member from being damaged. In addition, the accessory optical member is protected from water, etc. and can be maintained heavy-duty. Since the accessory optical member is attached to the inside of the waterproof case, the accessory optical member can be close to the taking lens of the camera, so that the accessory optical member can be compact. The compact optical member is easy to carry if it is detached from the waterproof case. Furthermore, the accessory optical member is attached to the inside of the waterproof case, and thus, the accessory optical member could not be dropped. Incidentally, if the accessory optical member is attached to the camera, there is the necessity for providing the attachment part for the accessory optical member on the camera, and the camera cannot be compact or lightweight and the design of the camera cannot be satisfactory. There is no such problem if the accessory optical member is attached to the inside of the waterproof case.

In the waterproof case for the camera according to the present invention, the flash device is built in the waterproof case. For this reason, the flash device can emit a large quantity of light suitably for the shooting with the flash in unfavorable conditions without being restricted by the size of the camera contained in the waterproof case, or the like. Moreover, the battery for the flash device built in the waterproof case is provided in the waterproof case, the power may be supplied appropriately to the flash device that emits a large quantity of light. The battery is attached to and detached from the battery receiving part formed in the case body, and the battery receiving part is formed opposite to the hinge of the lid on the case body across the camera receiving part. It is therefore easy to replace the batteries. The flash device built in the waterproof case according to the present invention does not have to be waterproof itself. Furthermore, if the flash of the flash device built in the camera is sensed to synchronize the flash device built in the waterproof case with the camera, there is no necessity of connecting the synchronization-cable, etc. The flash device built in the waterproof case is complete in the waterproof case. It is convenient for the shooting with the flash since there is no necessity of attaching a waterproof flash on the outside of the waterproof case and connecting the synchronization-cable, or the like.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A waterproof case for a camera, such that said camera can be operated from within said waterproof case, said waterproof case comprising:

a case body for containing the camera, the case body having an opening;

a lid for closing the opening of the case body watertightly, the lid being hinged to the case body; and a lid holding mechanism which holds the lid open at either one of an arbitrary angle and a predetermined angle throughout a range of opening angles of the lid with respect to the opening of the case body.

2. A waterproof case for a camera, such that said camera can be operated from within said waterproof case, said waterproof case comprising:

a case body for containing the camera, the case body having an opening;

a lid for closing the opening of the case body watertightly, the lid being movably attached to the case body; and a camera moving mechanism which moves the camera contained in the case body to a predetermined position automatically upon opening of the lid.

3. A waterproof case for a camera, such that said camera can be operated from within said waterproof case, the waterproof case comprising:

a case body for containing the camera, the case body having an opening;

a lid for closing the opening of the case body watertightly, the lid being hinged to the case body; and a lid holding mechanism which holds the lid open at either one of an arbitrary angle and a predetermined angle with respect to the opening of the case body; and a camera moving mechanism which moves the camera contained in the case body to a predetermined position automatically upon opening of the lid.

4. A waterproof case for a camera, comprising:

a case body for containing the camera; and an attachment part attached to the case body to face a taking lens of the camera contained in the case body, an accessory optical member being attached to and detached from the attachment part.

5. A waterproof case for a camera, comprising:

a case body for containing the camera;

an accessory optical member attached to the case body to face a taking lens of the camera contained in the case body; and a window member attached to the case body outside the accessory optical member to protect the accessory optical member.

6. A waterproof case for a camera, comprising:

a case body for containing the camera;

a first flash device arranged in the case body, the first flash device comprising a synchronizing device which synchronizes flashing of the first flash device with shooting of the camera contained in the case body, the first flash device flashing simultaneously with the shooting of the camera contained in the case body; and a battery for supplying electric power to the first flash device, the battery being arranged in the case body;

wherein the case body has an opening;

wherein a lid for closing the opening of the case body watertightly is hinged to the case body; and the case body comprises a camera receiving part for containing the camera and a battery receiving part for containing the battery, the battery receiving part being arranged opposite to a part at which the lid is hinged, across the camera receiving part.

7. A waterproof case for a camera, comprising:

a case body for containing the camera, the case body having an opening;

a lid for closing the opening of the case body watertightly, the lid being hinged to the case body; and a lid holding mechanism which holds the lid open at either one of an arbitrary angle and a predetermined angle with respect to the opening of the case body;

wherein the lid holding mechanism comprises one of:
   a click-stop mechanism for engaging on at least one rotational position of the lid;
   a friction providing member which provides predetermined friction to rotation of the lid; and
   a lock mechanism for locking the rotation of the lid on at least one rotational position of the lid.

8. A waterproof case for a camera, comprising:

a case body for containing the camera, the case body having an opening;

a lid for closing the opening of the case body watertightly, the lid being movably attached to the case body; and a camera moving mechanism which moves the camera contained in the case body to a predetermined position upon opening of the lid;

wherein the camera moving mechanism comprises:
   a camera attachment member arranged movably within the case body and provided with a camera attachment screw to be screwed into a tripod screw hole of the camera; and
   a pressing member which presses the camera attachment member to protrude the camera from the opening of the case body.

9. A waterproof case for a camera, comprising:

a case body for containing the camera, the case body having an opening;

a lid for closing the opening of the case body watertightly, the lid being hinged to the case body; and a lid holding mechanism which holds the lid open at either one of an arbitrary angle and a predetermined angle with respect to the opening of the case body; and a camera moving mechanism which moves the camera contained in the case body to a predetermined position upon opening of the lid;

wherein the lid holding mechanism comprises one of:
   a click-stop mechanism for engaging on at least one rotational position of the lid;
   a friction providing member which provides predetermined friction to rotation of the lid; and
   a lock mechanism for locking the rotation of the lid on at least one rotational position of the lid.

10. A waterproof case for a camera, comprising:

a case body for containing the camera, the case body having an opening;

a lid for closing the opening of the case body watertightly, the lid being hinged to the case body; and a lid holding mechanism which holds the lid open at either one of an arbitrary angle and a predetermined angle with respect to the opening of the case body; and a camera moving mechanism which moves the camera contained in the case body to a predetermined position upon opening of the lid;

wherein the camera moving mechanism comprises:
   a camera attachment member arranged movably within the case body and provided with a camera attachment screw to be screwed into a tripod screw hole of the camera; and
   a pressing member which presses the camera attachment member to protrude the camera from the opening of the case body.

11. A waterproof case for a camera, comprising:

a case body for containing the camera;

a first flash device arranged in the case body, the first flash device comprising a synchronizing device which synchronizes flashing of the first flash device with shooting of the camera contained in the case body; and a battery for supplying electric power to the first flash device, the battery being arranged in the case body;

wherein the camera comprises a second flash device for emitting light of smaller quantity than the first flash device; and wherein the second flash device emits light upon the shooting of the camera using the first flash device, a quantity of the light emitted from the second flash device when the camera is contained in the waterproof case being smaller than a quantity of light emitted from the second flash device when the camera is used separately from the waterproof case; and wherein the synchronizing device comprises a photodetector for sensing the light emitted from the second flash device, the synchronizing device activating the first flash device upon the sensing of the photodetector.

12. A camera, comprising:

a determining device which determines whether the camera is contained in a separate case such that the camera can be operated from within the separate case;

a flash device which emits light upon shooting of the camera; and a flash controlling device which controls the flash device such that a quantity of the light emitted from the flash device when the determining device determines that the camera is contained in the separate case is smaller than a quantity of light emitted from the flash device when the determining device determines that the camera is not contained in the separate case.

13. A waterproof case for a camera, comprising:

a case body for containing the camera;

a first flash device arranged in the case body, the first flash device comprising a synchronizing device which synchronizes flashing of the first flash device with shooting of the camera contained in the case body, the first flash device flashing simultaneously with the shooting of the camera contained in the case body; and a battery for supplying electric power to the first flash device, the battery being arranged in the case body;

wherein the first flash device further comprises a light quantity controlling device which controls a quantity of light emitted from the first flash device, the light quantity controlling device comprising a photodetector and stopping the first flash device from flashing when a quantity of light received by the photodetector reaches a predetermined quantity.

14. The waterproof case as defined in claim 8, wherein the camera moving mechanism further comprises a stopper for temporarily stopping the camera attachment member at a position permitting exchange of recording mediums for the camera.

15. The waterproof case as defined in claim 2, wherein the camera moving mechanism comprises:

a camera attachment member arranged movably within the case body and provided with a camera attachment screw to be screwed into a tripod screw hole of the camera; and a link mechanism provided between the camera attachment member and the lid.

16. The waterproof case as defined in claim 10, wherein the camera moving mechanism further comprises a stopper for temporarily stopping the camera attachment member at a position permitting exchange of recording mediums for the camera.

17. The waterproof case as defined in claim 3, wherein the camera moving mechanism comprises:

a camera attachment member arranged movably within the case body and provided with a camera attachment screw to be screwed into a tripod screw hole of the camera; and a link mechanism provided between the camera attachment member and the lid.

18. The waterproof case as defined in claim 4, wherein the accessory optical member is at least one of a wide conversion lens, a telephoto conversion lens, and a filter.

19. The waterproof case as defined in claim 5, wherein the accessory optical member is at least one of a wide conversion lens, a telephoto conversion lens, and a filter.

20. The waterproof case as defined in claim 6, wherein the camera comprises a second flash device for emitting light of smaller quantity than the first flash device.

21. The waterproof case as defined in claim 6, wherein the first flash device further comprises a light quantity controlling device which controls a quantity of light emitted from the first flash device, the light quantity controlling device comprising a photodetector and stopping the first flash device from flashing when a quantity of light received by the photodetector reaches a predetermined quantity.

22. The waterproof case as defined in claim 6, wherein the camera contained in the case body comprises a second flash device for emitting light upon the shooting of the camera; and wherein the synchronizing device comprises a photodetector for sensing the light emitted from the second flash device, the synchronizing device activating the first flash device upon the sensing of the photodetector.

23. The camera as defined in claim 12, wherein the determining device comprises a detector detecting contact thereof with a predetermined member of the separate case.

* * * * *